(12) United States Patent
Obara et al.

(10) Patent No.: US 6,535,954 B2
(45) Date of Patent: *Mar. 18, 2003

(54) STORAGE SUBSYSTEM WITH MANAGEMENT SITE CHANGING FUNCTION

(75) Inventors: Kiyohiro Obara, Hachioji (JP); Yoshifumi Takamoto, Kokubunji (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,028

(22) Filed: Apr. 8, 1999

(65) Prior Publication Data

US 2002/0194426 A1 Dec. 19, 2002

(30) Foreign Application Priority Data

Apr. 10, 1998 (JP) .......................................... 10-098693

(51) Int. Cl.[7] .............................................. G06F 12/00
(52) U.S. Cl. ........................ 711/114; 711/112; 711/154; 710/38; 710/316; 709/105; 709/239
(58) Field of Search ........................ 711/111–114, 154, 711/4; 709/105, 239; 710/38, 316; 369/47.15, 47.16, 47.24

(56) References Cited

U.S. PATENT DOCUMENTS

| 4,862,411 A | * | 8/1989 | Dishon et al. ................. 360/15 |
| 5,649,212 A | * | 7/1997 | Kawamura et al. ......... 713/324 |
| 5,778,242 A | * | 7/1998 | Wang ........................... 712/40 |
| 6,145,028 A | * | 11/2000 | Shank et al. .................. 710/31 |
| 6,378,039 B1 | * | 4/2002 | Obara et al. ................ 709/105 |

FOREIGN PATENT DOCUMENTS

JP          3294938          12/1991

\* cited by examiner

Primary Examiner—Matthew Kim
Assistant Examiner—Matthew D. Anderson
(74) Attorney, Agent, or Firm—Antonelli, Terry, Stout & Kraus, LLP

(57) ABSTRACT

A storage subsystem which includes a plurality of disk controllers, a plurality of disk drives connected via a network to the plurality of disk controllers, and a path controller connected to the plurality of disk controllers. The path controller changes a management site, which manages a volume in each disk drive managed by each disk controller, from one disk controller to another. The path controller has a correspondence table which stores a correspondence between a volume number of a volume in each disk drive and identification information of the disk controller which manages a volume corresponding to the volume number.

8 Claims, 12 Drawing Sheets

FIG. 3

| Volume Number | Disk Interface Number | Disk Drive Number | HDA Number | Cylinder Offset |
|---|---|---|---|---|
| ... | ... | ... | ... | ... |
| 10 | 0 | 1 | 0 | 0 |
| 11 | 0 | 1 | 0 | 20 |
| ... | ... | ... | ... | ... |

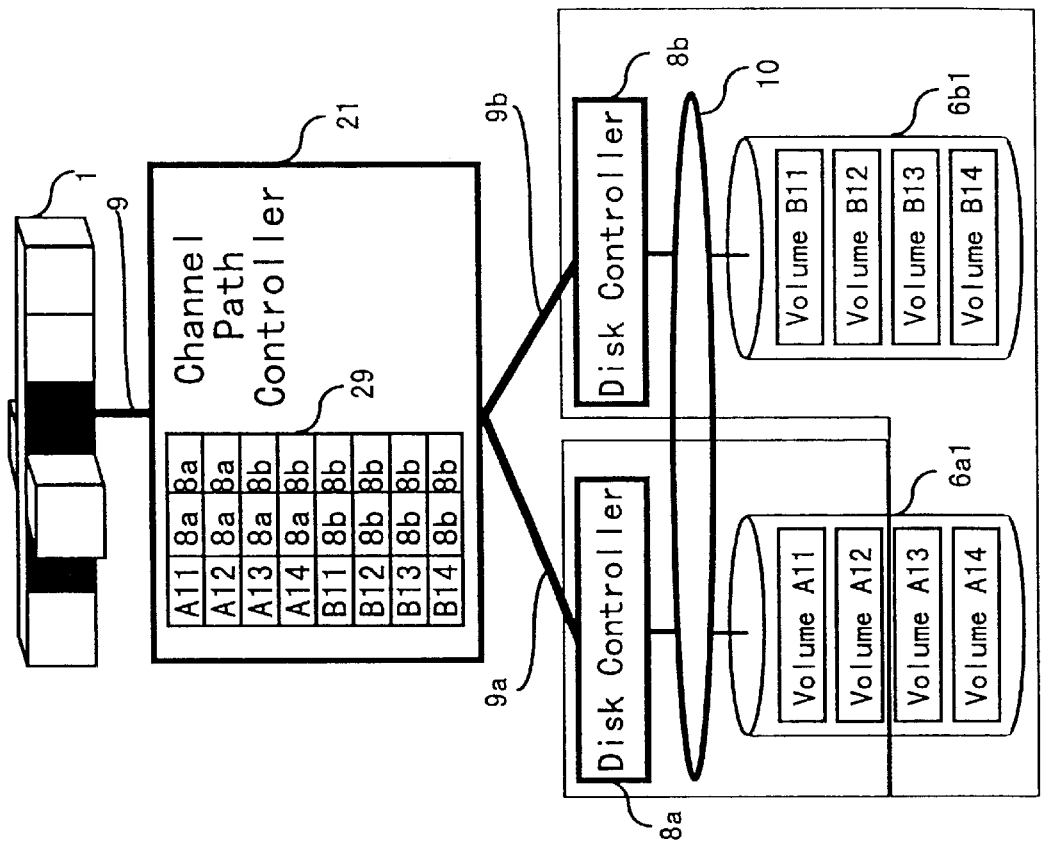
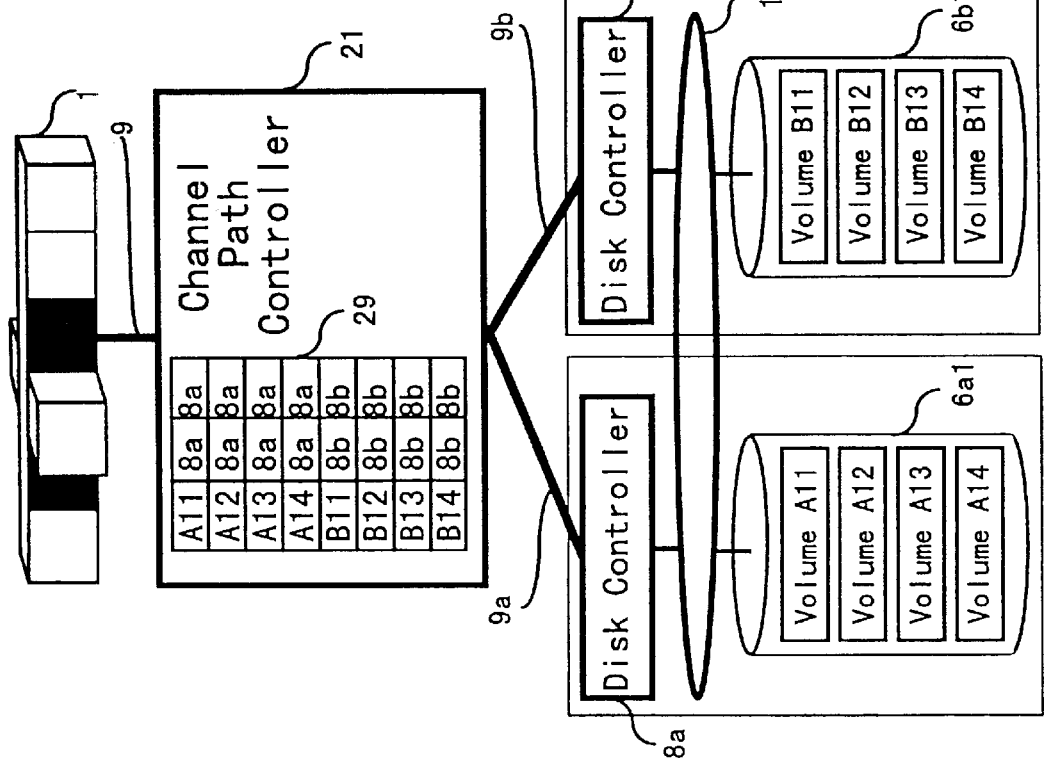

STORAGE SUBSYSTEM WITH MANAGEMENT SITE CHANGING FUNCTION

BACKGROUND OF THE INVENTION

1. Field of the Invention

The present invention relates to load balancing in a plurality of disk controllers or in a single disk controller. More specifically, the invention relates to load balancing in a disk system in which disk controllers and disk drives are interconnected by a network or a switch.

2. Description of the Related Art

In order to increase the performance and capacity of an already installed disk system, new disk controller and corresponding disk drives are added to the system. More specifically, if the performance of the system is important, the number of disk drives per one disk controller is set smaller to reduce the load of the disk controller, whereas if the capacity of the system is important, the number of disk drives per one disk controller is set larger. It is supposed that broad scalability of the performance and capacity of a disk system can be achieved if the system is configured by a plurality of disk controllers and disk drives.

However, the range of scalability in such a system is based upon the assumption that accesses to each disk controller and each volume in a disk drive occur uniformly. In practical use, however, the number of accesses is different at each disk controller and each volume, so that the load of each disk controller and volume is also different. This difference depends upon the type of an application running on a host computer, and changes with time even the same application is used. An example of this is a relation between an on-line transaction in day time and a batch process in night time. Therefore, in the system configuration using a plurality of disk controllers, the loads of disk controllers become unbalanced so that it is difficult to effectively use the full power of all installed controllers.

As a means for eliminating such unbalance, a user or system engineer adjusts the loads, for example, by reallocating volumes and files between disk controllers. Namely, manual adjustment has been performed heretofore. It is therefore impossible to provide quick response to a change in the running state of a computer. Further, the reallocation process itself is a very heavy process taking a long time because a large amount of data transfer is performed via a host processor, resulting in many problems such as an increased host load. Furthermore, it is necessary to inhibit data renewal during the reallocation process in order to maintain data integrity. As above, such a reallocation process is associated with a number of problems in terms of system operation, e.g., an application utilizing data cannot be executed during the reallocation process until the completion of reallocation. Load unbalance is therefore inevitable for a conventional disk system using a plurality of disk controllers, and it is substantially impossible for a plurality of disk controllers to use the full performance thereof at the same time.

In contrast, a single disk controller is constituted of components such as a channel interface for interface with a host computer, a disk interface for interface with a disk drive, and a cache memory. These components of a single disk controller are interconnected by a means having a high interconnect performance such as a shared bus, and generally a plurality of channel interfaces and disk interfaces are used.

From this structural reason of a single disk controller, load balancing in the controller can be made easily. Specifically, a disk drive upon which accesses are concentrated is preferentially allocated with resources such as channel interfaces and caches in order to provide a best total performance of the disk controller. Namely, a disk system configured by a single disk controller is more resistant against load unbalance to be caused by different numbers of accesses, than a disk system configured by a plurality of disk controllers, if the systems have the same capacity, and in the former system, the reallocation process of files and volumes is not necessary.

In a system in which a shared-nothing type database management system runs on a loosely coupled processor system, a method of dynamically changing a connection between each processor and an external storage device to be accessed by the processor, is described in JPA-9-73411 (hereinafter referred to as "document 1"). This document 1, however, discloses only host load balancing, and does not disclose load balancing of a disk controller and host load reduction during file reallocation.

A method of migrating files between drives in accordance with an access occurrence frequency is disclosed in JP-A-3-294938 (hereinafter referred to as "document 2"). This document 2 does not disclose, however, reallocation of files without transferring them between drives.

Recently, the number of disk drives and the number of channel paths (paths to a host) to be managed by a single disk controller are increasing greatly because of an increased capacity of each disk drive and because of developments of disk array techniques. With current techniques, therefore, it is difficult to increase by a large degree the number of disk drives and the number of channel paths to be managed, while the configuration of a single disk controller is maintained. The reason for this will be described in the following. A disk controller performs communications with all components via a shared bus in order to provide a high interconnect performance. Therefore, if the number of components such as disk interfaces and channel interfaces increases as the storage capacity and the number of channel paths increase, the shared bus becomes a bottleneck.

In order to avoid a problem of performance to be restricted by such a bottleneck and improve the performance of a disk controller in a scalable manner, the configuration using a plurality of disk controllers and disk drives is essentially suitable.

However, as described earlier, a conventional system with the configuration described above cannot efficiently perform load balancing between disk controllers. In other words, a problem of load unbalance between disk controllers cannot be solved efficiently.

After study of the essence of the problem of such load unbalance between disk controllers has been studied and the following points have been found.

The load unbalance state of the configuration using a plurality of disk controllers and drives will be described in the following. If accesses from a host are concentrated upon some of a plurality of disk drives and volumes connected to one disk controller which manages them, the load of the disk controller becomes excessive. In this case, it is assumed that the performance limit of the disk controller is lower than the performance limit of disk drives under management. Generally, one disk controller manages a number of disk drives. For example, if one disk controller manages ten disk drives and accesses are concentrated upon five disk drives, the disk controller generally enters an overload state before the disk drives enter an overload.

A conventional system incorporates a fixed correspondence among disk drives and volumes and disk controllers managing the volumes. Therefore, even if a disk driver or volume with less accesses is to be accessed, a disk controller having an overload is sometime used. In such a case, even if the target disk drive or volume has a low load, an access to this is required to stand by because an overload disk controller is used.

From a study of the above, the following points become definite. Namely, an overload of a disk controller results from concentration of accesses from a host upon some disk drives or volumes managed by the disk controller, and this access concentration problem results from a fixed controllers managing volumes.

SUMMARY OF THE INVENTION

It is therefore an object of the present invention to provide means for transferring management of desired disk drives and volumes to be managed by an overload disk controller under access s concentration to an optional disk controller not in an overload state while an application on the host and an ordinary process of the disk controllers are maintained to continue. Accordingly, load can be distributed into a plurality of disk controllers and a best total performance of each of disk controllers of the disk system can be provided to thereby realize the disk system with a good cost performance.

From the different viewpoint, the object of the invention is to provide a disk system capable of reallocating files and volumes under management to desired disk controllers without actual data transfer.

It is another object of the present invention to provide a disk system capable of automatically reallocating files and volumes when a disk controller is added to the system, and self-regulatory balancing loads between disk controllers. Such reallocation and load balance are applicable also to the case wherein only a disk controller or controllers are added.

It is still another object of the invention to provide a disk system capable of transferring volume management and changing volumes through reallocation, transparently with respect to a host processor.

In order to achieve the above objects of the invention, a plurality of disk controllers and disk drives are interconnected by a network or a switch. There are provided means for exchanging volumes between disk controllers in accordance with a load of each disk controller, means for changing an access path from a host to a disk controller when the volumes are exchanged, and means for converting the volume number and access path designated by the host computer in order to make transparent the volume exchange and access path change with respect to the host processor.

BRIEF DESCRIPTION OF THE DRAWINGS

FIG. 3 is a diagram showing an example of the structure of volume information.

FIGS. 4(a) and 4(b) are diagrams illustrating an example of a load balancing method to be realized by a disk controller by changing volumes under control by the disk controller.

DETAILED DESCRIPTION OF THE EMBODIMENTS

With reference to FIG. 1 to FIG. 12(b), embodiments of the invention will be described.

Figure 2:
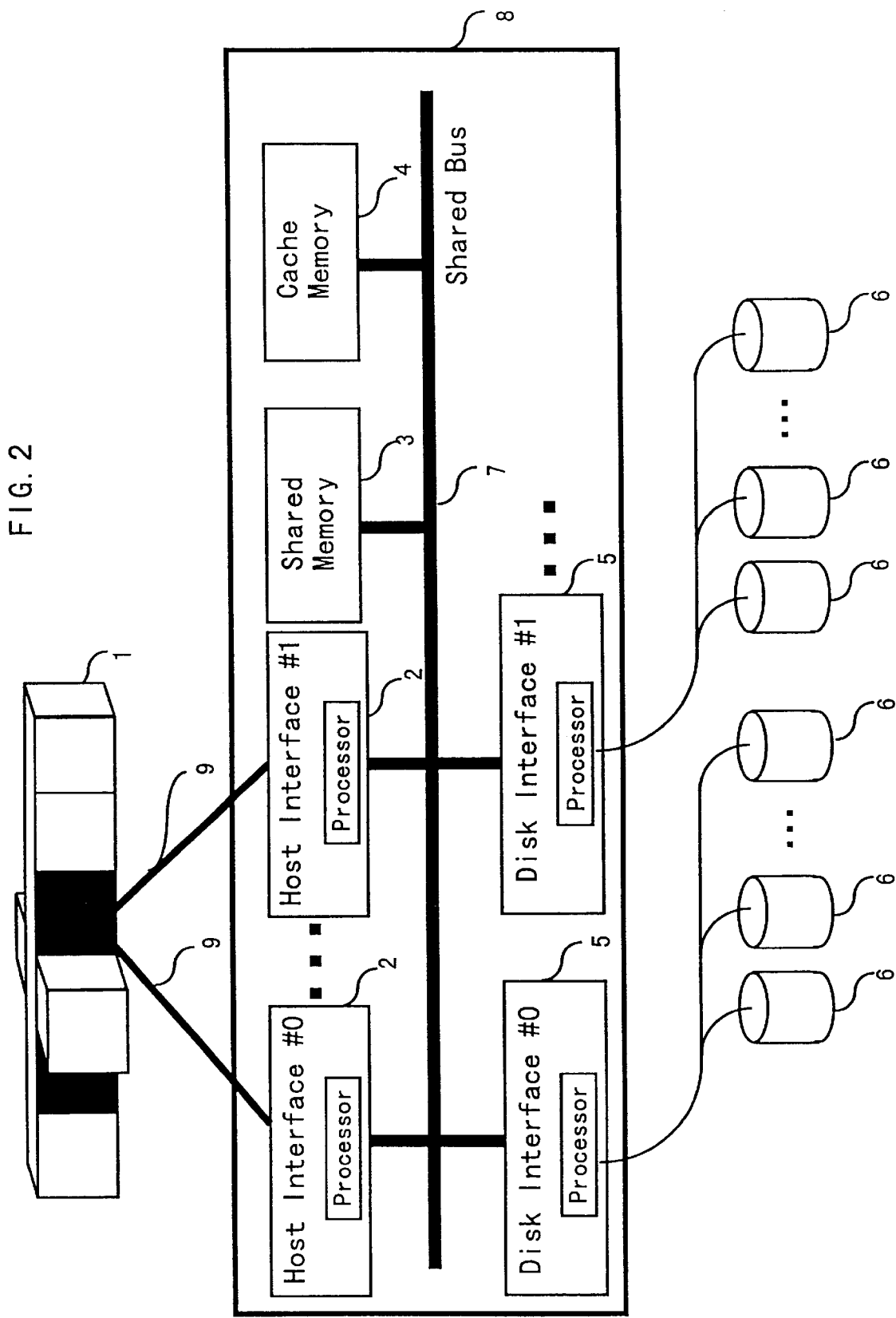
FIG. 2 shows a configuration example of a disk controller and disk drives.

FIG. 2 shows a configuration example of a single disk controller. A disk controller 8 is connected to a host computer 1 via host interfaces 2 and channel paths 9, and has a shared memory 3, a cache memory 4, disk interfaces 5 for interface with a plurality of disk drives 6, and a shared bus 7 connecting these components. A plurality of disk interfaces can be installed. A plurality of host interfaces 2 can also be installed, and in this case, a single host or a plurality of hosts may be used. In this embodiment shown in FIG. 2, each host interface is connected to the same host 1.

The host interface 2 and disk interface 5 each have a processor which self-regulatively operates. The shared memory 3 and cache memory 4 are shared resources capable of being referred to from a plurality of host interfaces 2 and disk interfaces 5. The cache memory 4 temporarily stores data written in the disk controller and data read from the disk drive 6 and output to the host.

The shared memory 3 stores management information of data in the cache memory. This management information is called a cache directory. By using as a search key a volume number and intra-volume record position information (cylinder number, head number, record number and the like) written in a read/write command or the like supplied from the host, the host interface 2 and disk interface 5 search the cache directory information. Therefore, the host interface 2 and disk interface 5 can judge whether the data to be read/written is in the cache memory (cache hit) or not in the cache memory (cache miss) and, in the case of a cache hit, can acquire the location of the data in the cache memory. Although the shared memory 3 and cache memory 4 may be realized by the same hardware structure, they are discriminated in accordance with the storage contents. Namely, raw input/output data is stored in the cache memory, whereas control information of data management on the cache memory is stored in the shared memory.

The shared memory also stores detailed information regarding the configuration of the disk controller as subsystem configuration information such as connected disk drivers, the number of channel paths, and the capacities of the cache memory and shared memory. Information of a disk drive in which a volume is stored, information of the disk interface connected to the disk drive, and the capacity and format of a volume, is also stored as volume information.

If the disk controller has a disk array function, data sent from the host is divided aid distributively stored in a plurality of disk drives or in a plurality of HDA (head disk assemblies) constituting a disk drive. If data is distributively stored by adopting a disk array configuration, the disk array configuration information such as the disk drive used by a volume and a list of HDA is also stored as the volume information. Although this embodiment is also applicable to the disk array, in the following description the operation of an ordinary disk will be described by way of example, for the simplicity of description.

Next, the data input/output operation between the host computer 1 and disk controller 8 will be described.

Figure 10:
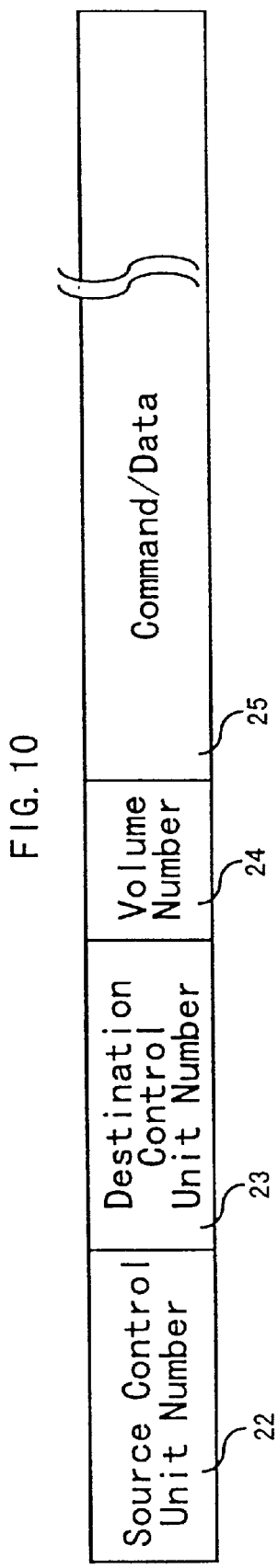
FIG. 10 is a diagram showing an example of a frame to be passed from a host computer to a disk controller.

Data input/output or data exchange between the host computer 1 and disk controller is performed via the channel path 9 by using a predetermined format. This data is called a frame. The format of the frame is shown in FIG. 10. A source control unit number field 22 and a destination control unit number field 23 indicate a source control unit number and a destination control unit number, respectively. The control unit number is a number specifically assigned to each disk controller to discriminate between disk controllers. The control unit number of the host computer is "0".

A volume number field 24 indicates a volume in the disk controller designated by the source control unit number field 22 or destination control unit number field 23. Applied to the designated volume is an instruction or information in the next command/data field 25 in which a command or data is loaded. Although there are other fields, these fields are not referred to in this embodiment and so they are omitted.

If an application running on the host computer 1 executes a command of reading data at a cylinder number "2", a head number "3" and a record number "4" in the volume having a volume number "10" of the disk controller having a control unit number "8", then the contents of a frame transmitted from the host computer 1 to the disk controller 8 are: "8" entered in the destination control unit number field 23, "0" entered in the source control unit number field 22, "10" entered in the volume number field 24, and the read command and parameters including the cylinder number "2", head number "3" and record number "4" respectively entered in the command/data field 25.

The frame is received at the host interface 2. The host interface 2 identifies the target volume and the type of operation from the volume number field 24 and command/data field 25. It also identifies the disk interface in charge of this volume from the volume information in the shared memory and passes the operation to the identified disk interface.

An example of the volume information is shown in FIG. 3. The volume information is written in the table format. By using the volume number as a key, information of the volume is acquired. In this embodiment, information on the volume capacity and format is not referred to and so it is omitted.

The disk interface in charge of the operation also refers to the volume information to acquire a number of the disk drive in which the volume is stored, an HDA number and a cylinder offset value. In accordance with the acquired information, the disk interface issues an input/output command to HDA of the disk drive which stores the target volume. In the case of the frame contents described above, the volume number is "10". Therefore, from the volume information shown in FIG. 3, a read command is issued to HDA with a number "0" of the disk drive with a number "1" to thereby read data at the cylinder number "2", head number "3" and record number "4".

The capacity of one HDA is larger than one volume so that a plurality of volumes are stored in one HDA. Partitions of volumes in one HDA are determined by cylinder offset. Namely, in the example of the volume information shown in FIG. 3, the range of the volume number "10" of HDA "0" is from the cylinder "0" to cylinder "19", and the range of the volume number "11" starts from the cylinder "20". For the volume such as that of the volume number "11" whose range does not start from the number "0", the offset value is added to the cylinder number when the disk interface issues a command to HDA to thereby convert the cylinder number as viewed from the host into the real cylinder number.

Returning back to the input/output operation, in response to the read command, HDA returns the read data to the disk interface. The disk interface then returns the data to the host interface. The host interface generates a new frame for the read data and transmits it to the host computer 1. As the contents of this frame, the contents of the destination control unit number field are replaced by the contents of the source control unit number field and the contents of the command/data field are replaced by the requested and read data, as different from the contents of the frame first transmitted from the host computer.

In the above manner, data input/output is performed between the host computer 1 and disk controller 8.

Figure 1:
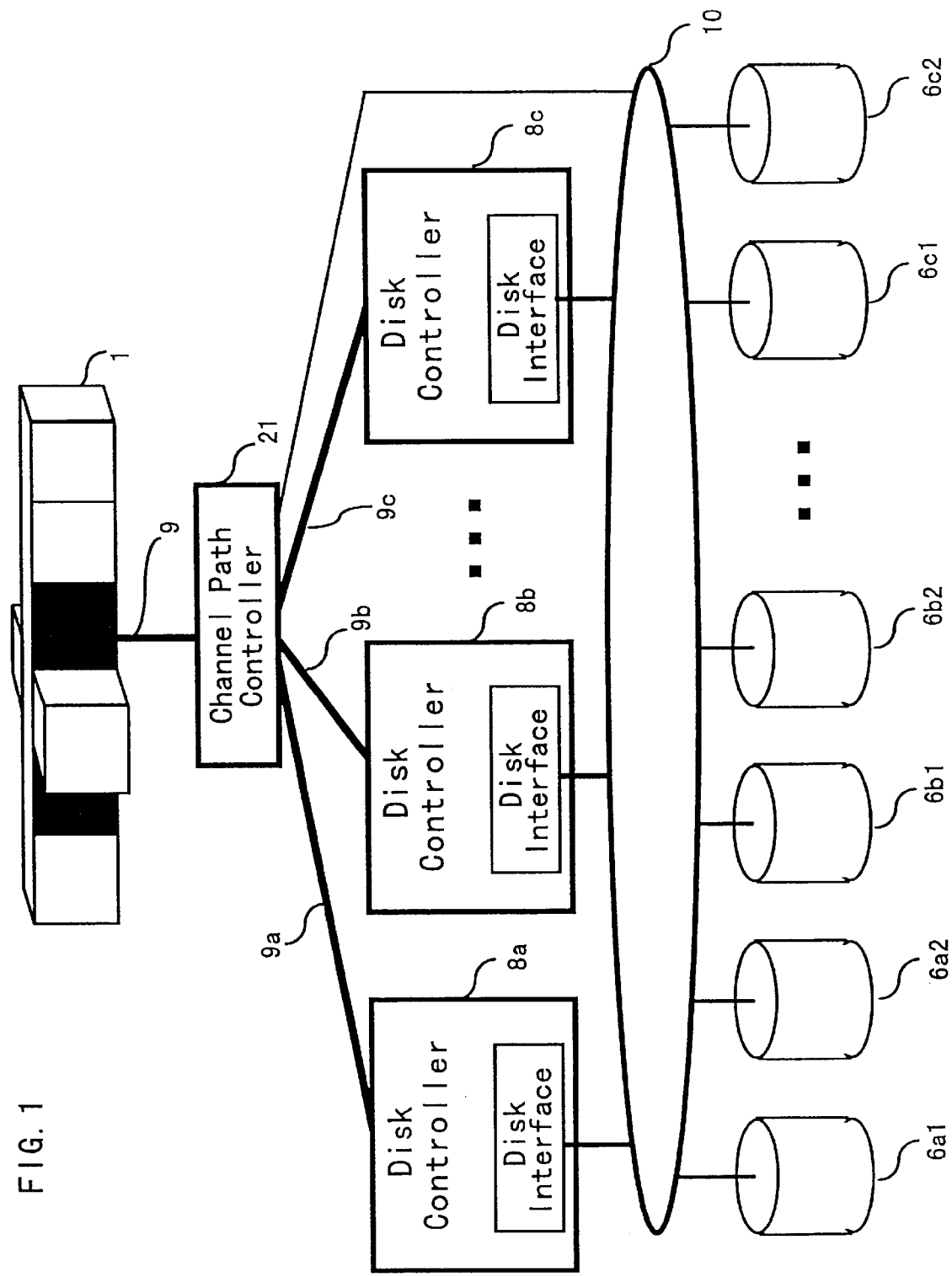
FIG. 1 shows a configuration example of disk controllers and disk drives according to the invention.

FIG. 1 shows an example of the configuration of disk controllers and disk drives according to a first embodiment of the invention. In this configuration, disk controllers 8a to 8c are connected via a device network 10 to disk drives 6a1 to 6c2. The device network 10 realizes the configuration that each disk controller can directly access all the disk drive and their volumes.

The device network may be structured by a general SCSI bus. However, in order to connect more disk controllers and disk drives, it is preferable to structure the network by using fiber channels or the like. In order to improve the total throughput of the device network, it is preferable to structure the network by a switch. Similarly, in order to improve the total throughput, a plurality of networks and switches may be used.

In the initial state, each disk controller is assigned disk drives and their volumes to be controlled by the disk controller. In the example shown in FIG. 1, the disk controller 8a controls the disk drives 6a1 and 6a2 and their volumes, the disk controller 8b controls the disk drives 6b1 and 6b2 and their volumes, and the disk controller 8c controls the disk drives 6c1 and 6c2 and their volumes.

A correspondence between each disk controller and disk drives and volumes to be controlled by the disk controller is stored also by an operating system of the host computer. Therefore, generally a correspondence between each disk controller and volumes to be controlled by the disk controller cannot be changed while the host computer is running.

In order to enable to change the correspondence between each disk controller and volumes to be controlled by the disk controller while the host computer is running, a channel path controller 21 is provided which controls an exchange of a frame between the host computer and disk controller.

Figure 11:
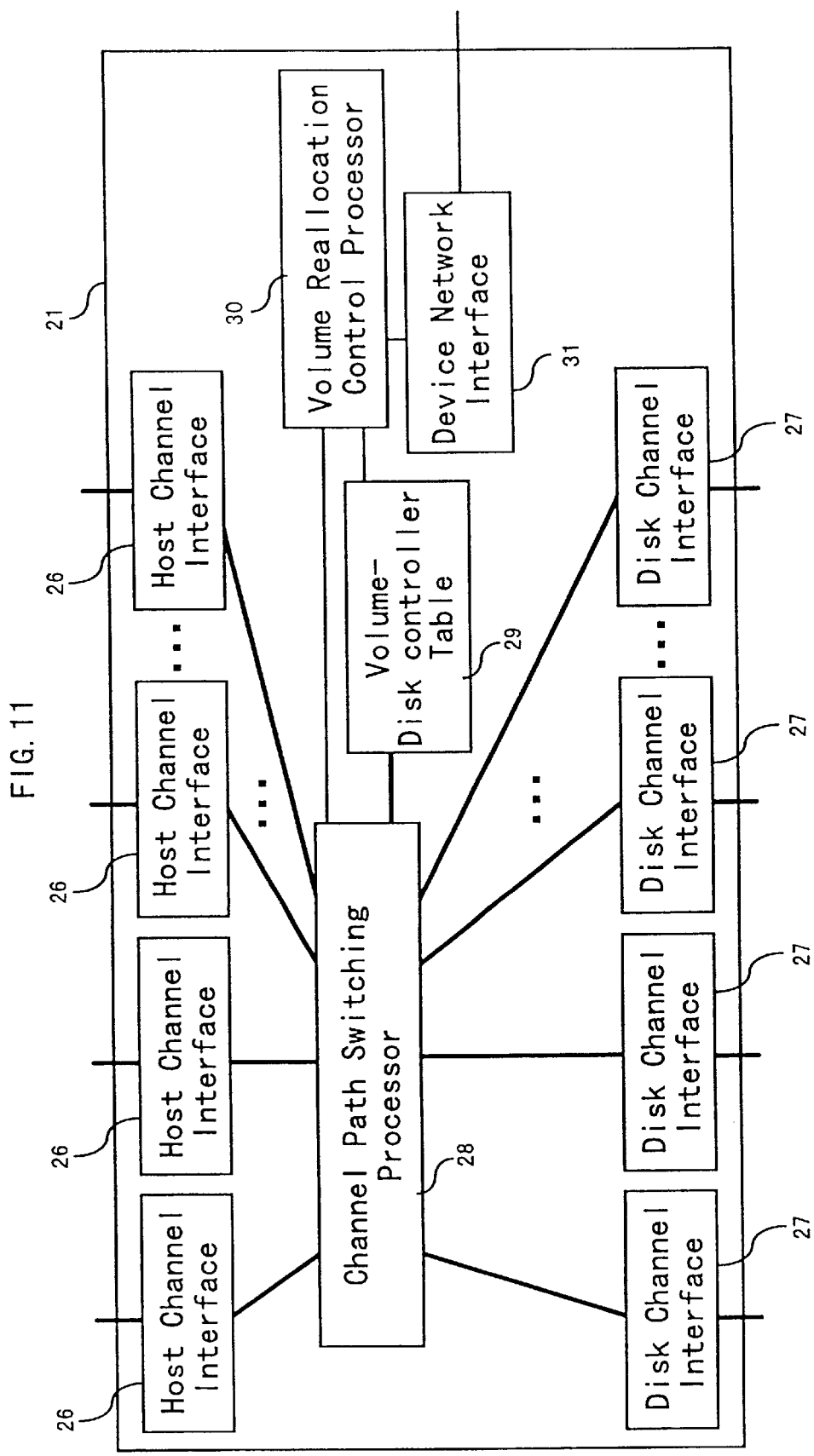
FIG. 11 is a diagram showing a configuration example of a channel path controller.

An example of the structure of the channel path controller is shown in FIG. 11. A host channel interface 26 is used for interface with the host computer. A disk channel interface 27 is used for interface with the disk controller. If both the host computer side and disk controller side use the same protocol, the host channel interface 26 and disk channel interface 27 can use the same hardware structure.

A channel path switching processor 28 has therein a processor, a memory and a control program. The operation of the control program is as in the following. A frame supplied from the host channel interface 26 is sent to the disk channel interface 27 connected to a proper disk controller. The disk channel interface 27 transmits the frame to the disk controller. Conversely, a frame supplied from the disk control is returned to the host computer. The proper disk controller is such a disk controller as selected after the destination control unit number and volume number of the frame are converted in accordance with a volume/disk-controller correspondence conversion table 29.

The volume/disk-controller, correspondence conversion table 29 is used for obtaining a table indicating a correspondence between volumes and disk controllers under the charge of the channel path controller 21, from a correspondence between volumes and disk controllers stored by the operating system. Since this table 29 is independent from the correspondence between volumes and disk controllers stored by the operating system, a frame for a desired volume can be transmitted to a desired disk controller without changing the operating system and an application running on the host, while the host computer is maintained to operate. In other words, a change in the correspondence between a disk controller and volumes to be controlled by the disk controller can be made transparent relative to the host computer.

A volume reallocation control processor 30 has therein a microprocessor and controls a destination of a frame to be used by the channel path switching processor, by changing the volume/disk-controller table 29 in accordance with the state of each disk controller. A specific method of controlling a destination in accordance with the state of each disk controller will be later described.

The state of each disk controller is collected via a device network interface 31. In the example of this configuration, it is possible to exchange information and input/output data among the disk controllers and the channel path controller without using the host computer. In other words, the device network 10 is used not only for transfer of data stored in the disk drivers but also as an information exchange network between the disk controllers. It is obvious that similar information exchange is possible via the host computer or another network different from the device network configured between the disk controllers.

Next, a load balancing method of the invention will be described. The load balancing of the invention is realized by changing as desired the correspondence between a disk controller and volumes controlled by the disk controller, transparently with respect to the host computer and an application running on the host computer. This corresponds to a reallocation of volumes without data transfer between disk controllers and to a transparency of the reallocation with respect the host computer and an application.

For example, as indicated by narrow lines of FIG. 4A, it is assumed that in the initial state a disk controller 8a controls volumes A11 to A14 and a disk controller 8b controls volumes B11 to B14. Such a correspondence between the disk controllers and volumes is reflected upon the volume/disk-controller correspondence conversion table 29 in the channel path controller 21.

Each row of the volume/disk-controller correspondence conversion table 29 shown in FIG. 4(a) indicates a correspondence between a disk controller and a volume. The first and second columns indicate a volume and a control unit number of the disk controller for controlling the volume as viewed from the host computer, and the last column indicates a control unit number of the disk controller which actually controls the volume. For example, the first row indicates that a volume, which is identified by the host computer as the volume A11 to be controlled by the disk controller 8a, is actually controlled by the disk controller 8a. The channel path switching processor 28 in the channel path controller 21 refers to the destination control unit number and volume number in a frame supplied from the host, and determines the disk controller actually controlling the volume indicated by the frame, in accordance with the volume/disk-controller correspondence conversion table, to thereby transmit the frame to the determined disk controller.

Consider now the case wherein accesses are concentrated upon the volumes A11 and A12. In this case, the load of the disk controller 8a becomes heavy and loads of the disk controllers 8a and 8b are unbalanced. Accesses to the volumes A13 and A14 are required to stand by because these accesses are controlled by the heavy load disk controller 8a. In this case, as shown in FIG. 4(b), the volume/disk-controller correspondence conversion table 29 is changed so that accesses to the volumes A13 and A14 are passed to the disk controller 8b which controls the volumes A13 and A14.

In the above manner, reallocation of volumes between the disk controllers is performed without affecting the host computer and without changing the application program running on the host computer, while the application program is maintained to operate. Therefore, the load of the disk controller 8a can be reduced and the total throughput of the system can be optimized.

Figure 5:
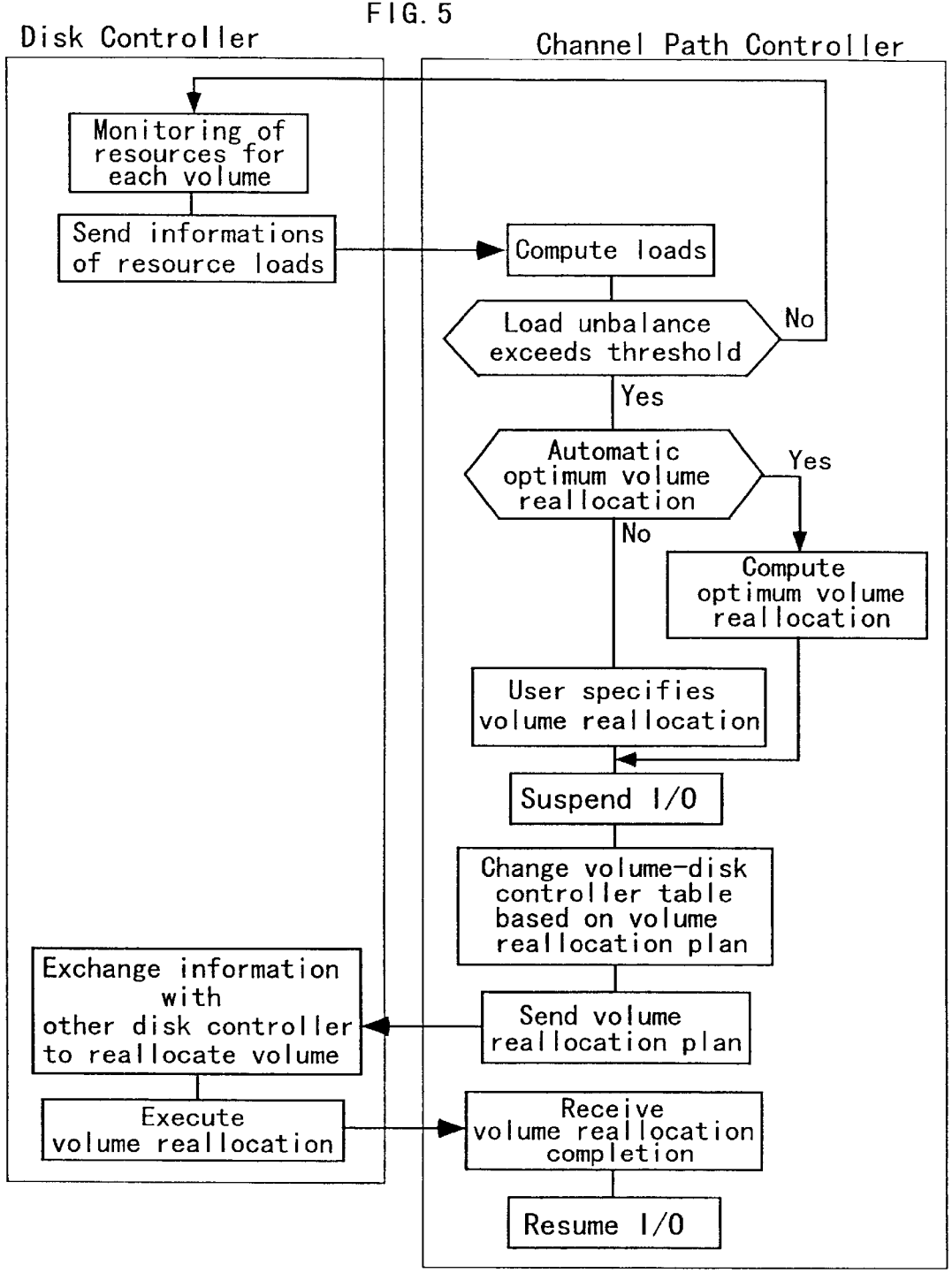
FIG. 5 is a flow chart illustrating a volume reallocation process to be executed by a system in which a disk controller realizes a load balancing by changing volumes under control by the disk controller.

Next, a specific procedure of load balancing through volume reallocation without data transfer between disk controllers will be described with reference to the flow chart shown in FIG. 5.

Each disk controller judges its load by monitoring utilization of each resource. Examples of resources include the channel path, host interface, shared memory, cache memory, shared bus, disk interface, path to a disk drive, and the like. The disk controller monitors each use factor of these resources as a load of each volume under the charge of the disk controller. Specific examples of use factors are a processor operation rate in the case of the host interface and disk interface, the number of accesses per unit time in the case of the shared memory, cache memory and the like, and a use rate per unit time in the case of the shared bus, channel path, and path to the disk drive.

Load information of each volume monitored by each disk controller is collected via an information exchange network such as device network 10 by the volume reallocation control processor 30. In accordance with this information, the volume reallocation control processor 30 calculates the load of each disk controller. If a load unbalance exceeds a limit value, the volume reallocation control processor 30 determines the volume reallocation in order to make the loads of disk controllers be balanced. The limit value is predetermined by a user. If an automatic optimum volume reallocation is designated, the volume reallocation control processor 30 self-regulatively determines the reallocation in order to make the loads of disk controllers be balanced. In other cases, a user specifies the reallocation.

Next, the volume reallocation control processor 30 suspends an input/output data transfer between the host computer 1 and disk controller 8 by temporarily suspending the function of the channel switching processor 28. This suspension is performed in order to suppress an input/output data transfer in a transient state during the volume reallocation.

In accordance with the determined reallocation plan of volumes, the volume reallocation control processor 30 changes the volume/disk-controller correspondence conversion table 29 and sends the determined volume reallocation plan to each disk controller. In accordance with the volume reallocation plan, each disk controller changes the volumes to be managed. Since an optional disk controller can access a desired disk drive via the device network, the change in the volumes does not require a change in physical connection.

When an optional disk controller does not manage the volume which has been controlled by this disk controller, an access request for the volume is inhibited.

On the other hand, when an optical disk controller manages the volume which has been controller by another disk controller, the volume information of this volume becomes necessary.

More specifically, this volume information is information stored in the shared memory of each disk controller, and includes information such as a location (disk drive number) on the device network of the disk drive which stores the volume, a volume capacity and a volume format. This volume information is exchanged between a source disk controller and a destination disk controller, prior to execution of the reallocation of volumes. This exchange is performed also by using the device network. Instead of the device network, a dedicated network may obviously be used. The volume information is not necessary to be exchanged prior to execution o f volume reallocation, if information and the like of disk drives and volumes accessible by each disk controller are stored in advance in each disk controller.

Lastly, the volume reallocation control processor 30 resumes an input/output data transfer by recovering the suspended function of the channel path switching processor 28. With the above procedure, the load balancing through reallocation of volumes is realized.

In the example shown in FIGS. 4(*a*) and 4(*b*), two disk controllers and two disk drives are used. The load balancing of the invention is applicable to a system in which the optional number of disk controllers and the optional number of disk drives are connected to the device network. If the ability of disk controllers is insufficient, additional disk controllers may be added without changing the number of disk drives to distribute loads and thereby improve the total throughput of the system.

One feature of the invention resides in that actual data transfer is not necessary even if the volume reallocation is performed. It is therefore possible to perform reallocation in a very short time in the order of second. Another features is that there is no information to be shared and referred to at the same time by disk controllers. Namely, the disk controller and volumes under the charge of the disk controller perform operations similar to those of a conventional single disk controller, excepting the period during volume reallocation. A disk controller does not perform an input/output transfer of data to be stored (or already stored) in the volume to another disk controller. Accordingly, both realizing smooth load balancing between disk controllers and improving the scalable performance through additional installation of disk controllers can be satisfied.

The objects of the invention can also be realized without using the channel path controller. This method will be described as the second embodiment hereinunder.

Figure 9:
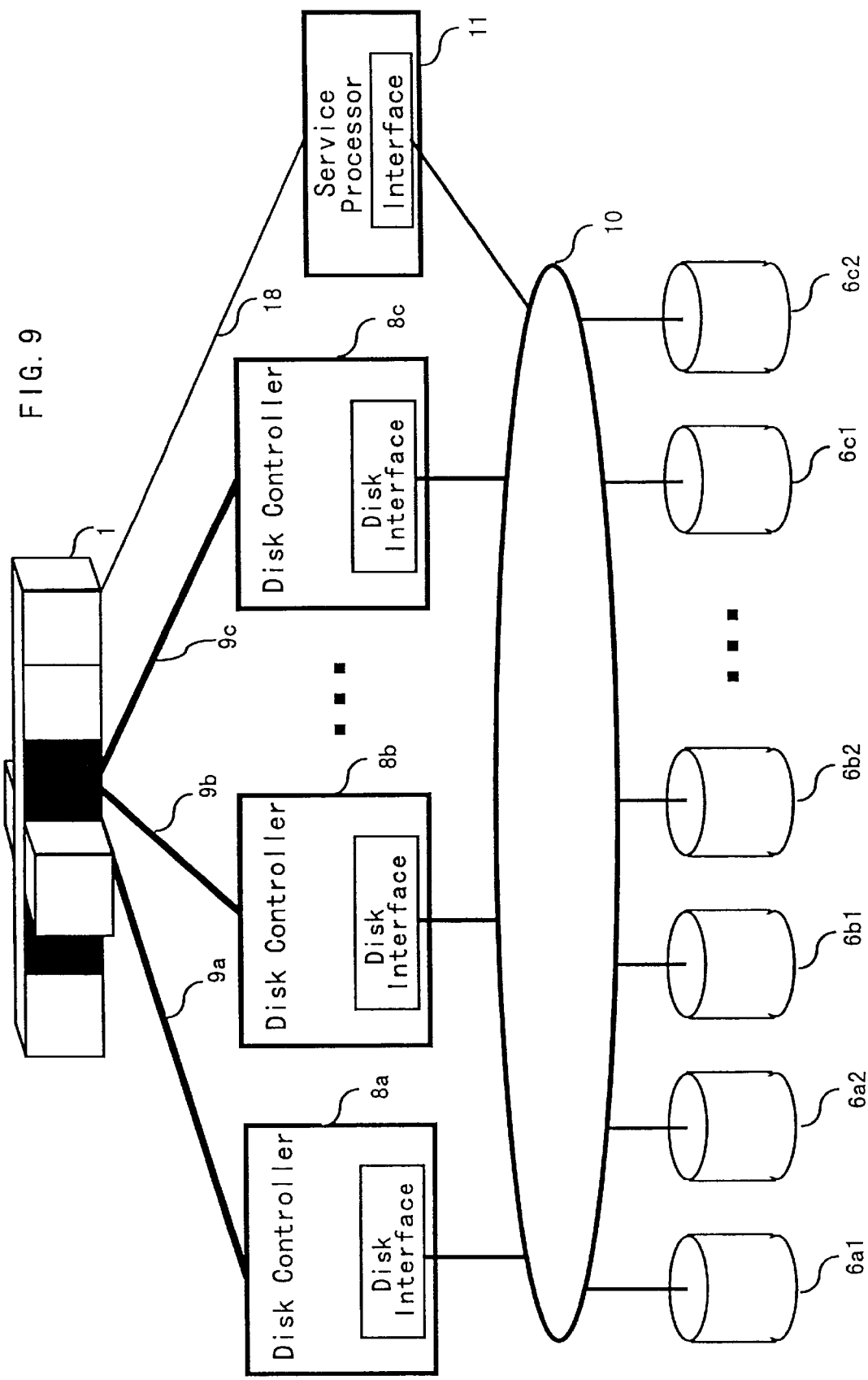
FIG. 9 shows another configuration example of disk controllers and disk drives according to the invention.
Figure 12:
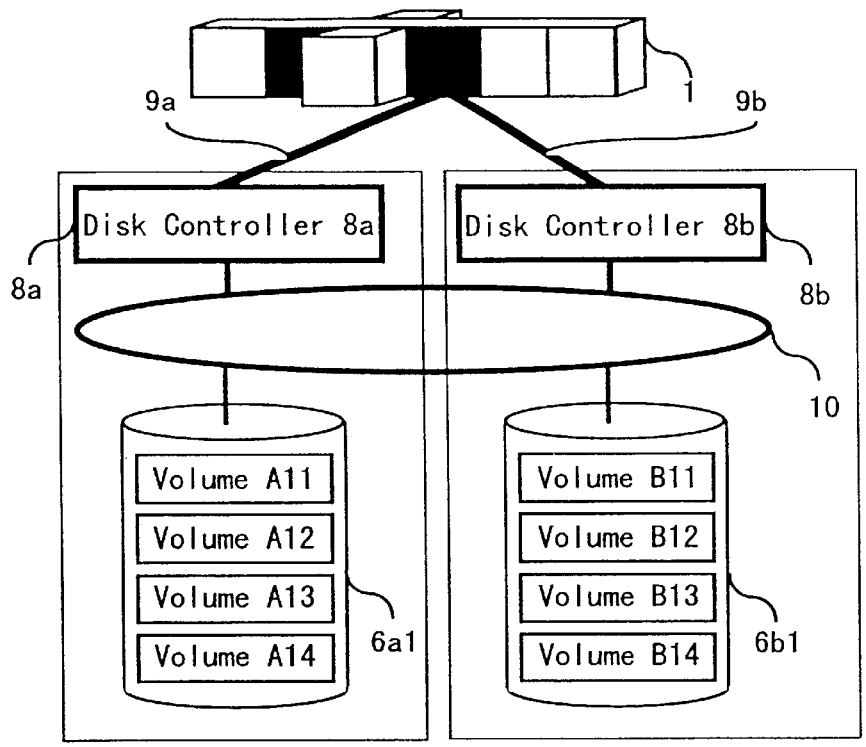
FIGS. 12(a) and 12(b) are diagrams illustrating a load balancing method to be executed by a disk controller by changing volumes under control by the disk controller.
Figure 12:
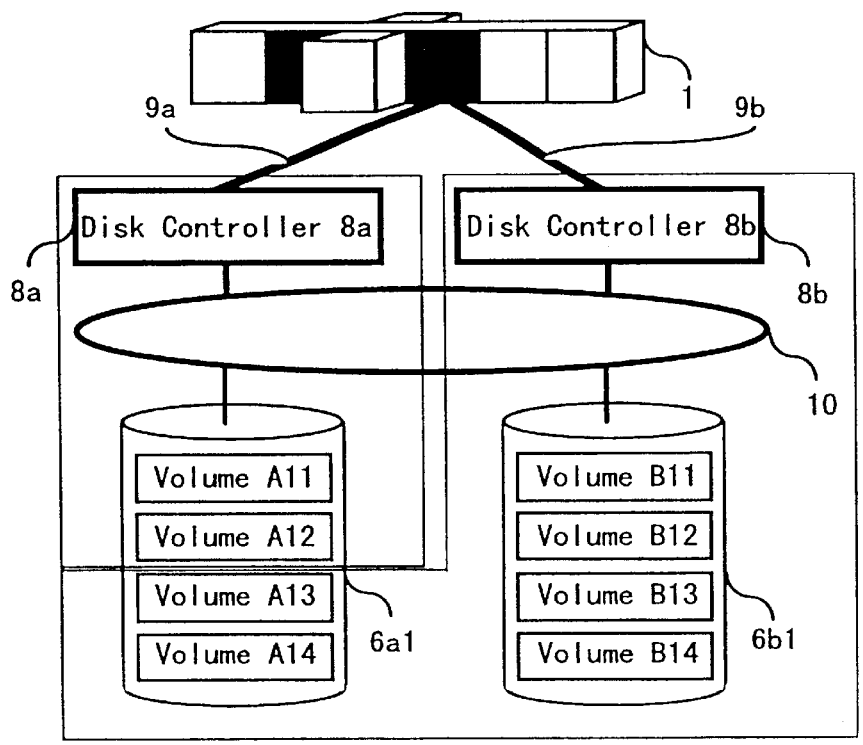

FIG. 9 shows an example of the configuration of a disk system according to the second embodiment. In this embodiment, the channel path controller of the first embodiment is not used. Since the channel path controller is not used, if volumes of each disk controller are changed from the state shown in FIG. 12(*a*) to the state shown in FIG. 12(*b*), the frame for the volume A13 is sent to the disk controller 8*a* even after the volume reallocation. In FIGS. 12(*a*) and 12(*b*), the range of volumes under the charge of each disk controller is indicated by narrow lines.

In this embodiment, an input/output control utility program running on a host computer 1 is used in order to avoid such transmission of an unnecessary frame and to make a change in each disk controller and reallocation of volumes under control by the disk controller transparent with respect to an application program running on the host computer.

A specific method of making transparent a change in each disk controller and reallocation of volumes under control by the disk controller by using an input/output control utility will be described hereinunder.

Figure 6:
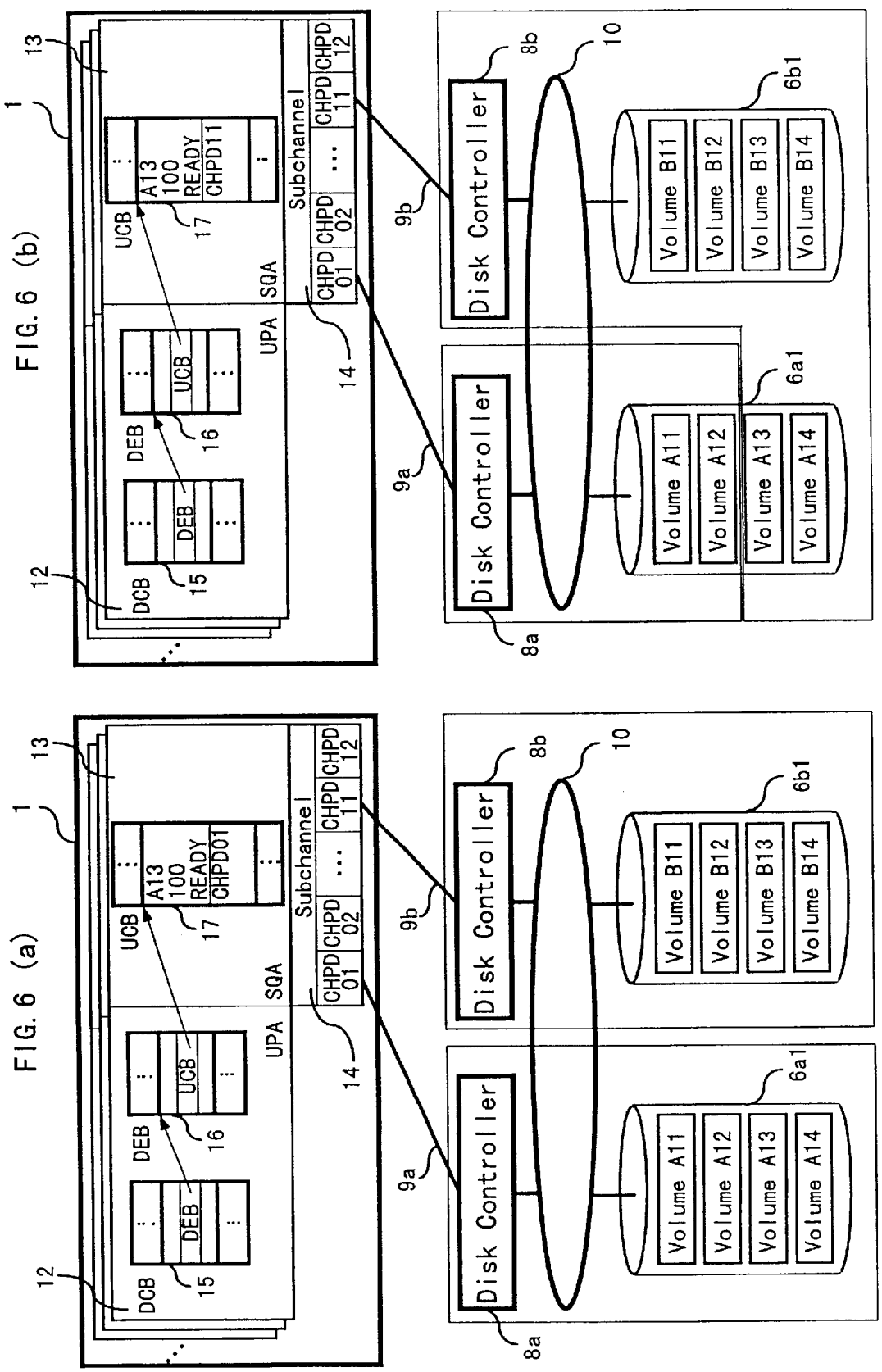
FIGS. 6(a) and 6(b) are diagrams illustrating a method of changing settings of an access path from a host computer to a disk controller synchronously with a volume transfer.

Reallocation of volumes to be controlled by disk controllers from the state shown in FIG. 12(*a*) to the state shown in FIG. 12(*b*) is used by way of example. FIG. 6(*a*) is a diagram showing the details of the control structure in the host computer 1 for data access in the state shown in FIG. 12(*a*). It is assumed that the operating system of the host is MVS (Multiple Virtual Storage) developed by IBM Corp. In FIG. 6(*a*), an UPA 12 is an abbreviation for a user program area of MVS storage map. An SQA 13 is an abbreviation for a system queue area of MVS storage map. The subchannel 14 executes an input/out put data transfer to disk controllers and the like and is connected with channel paths 9*a* and 9*b*. In the system shown in FIGS. 6(*a*) and 6(*b*), twelve channels can be connected at a maximum and respective connection devices are assigned ID's from CHPD01 to CHPD12.

With reference to FIG. 6(*a*), a conventional procedure of accessing a volume will be described. UPA 12 shown in FIG. 6(*a*) accesses the volume A13 by using the disk controller 8*a*. A specific procedure is as in the following.

A structure to be first referred to for disk access is a DCB (Data Control Block) 15 of UPA. DCB is formed when a data set to be accessed is opened, and stores a data set organization, a logical length of a record, record format information, and a pointer to a DEB (Data Extent Block) 16.

DEB is also formed when a data set to be accessed is opened, and stores: detailed information of a data set, i.e., an access method and information of a physical domain of DASD (Direct Access Storage Device) occupied by the data set; and a pointer to a UCB (Unit Control Block) 17.

UCB is stored in SQA, and generated for each volume when the host system is set up, in accordance with the information set by a hardware configuration definition. The contents of UCB can be changed by the input/output control utility to be described later. UCB stores detailed information of a volume, i.e., a volume serial number, a device number, a sub-channel number, a channel path ID number available when the volume is accessed, and the like. Also stored in UCB is information on whether the volume is in use, i.e., whether the volume is usable.

For example, UCB 17 shown in FIG. 6(*a*) stores the volume number "A13", device number "100" access available state "READY", and usable channel path ID "CHPD01". The device number is a unique number assigned to each volume.

With the above-described information structure, a usable channel path ID is recognized as CHPD01 via the route from DCB, DEB to UCB, and the volume A13 is accessed by using the channel path 9*a* and disk controller 8*a*.

As apparent from the foregoing description, the access path (channel path) between the host and volume is controlled by the information of UCB in SQA. Namely, the usable channel path can be changed by changing the information of the usable channel path ID in UCB without affecting the application program (while the application program is running).

FIG. 6(b) shows the control structure in the host for disk access when setting of the channel path is changed to the state shown in FIG. 12(b). As seen from the comparison with FIG. 6(a), information of the usable channel path ID in UCB 17 is changed from CHPD01 to CHPD11. With this change, it becomes possible to directly access the volume A13 via the channel path 9b by using the disk controller 8b which controls the volume A13.

The input/output control utility is a utility program for properly changing the information of the usable channel path ID in UCB synchronously with a change in the correspondence between a disk controller and volumes to be controlled by the disk controller. With this input/output control utility, the correspondence between a disk controller and volumes under the charge of the disk controller can be changed transparently with respect to an application program running on the host computer.

Figure 8:
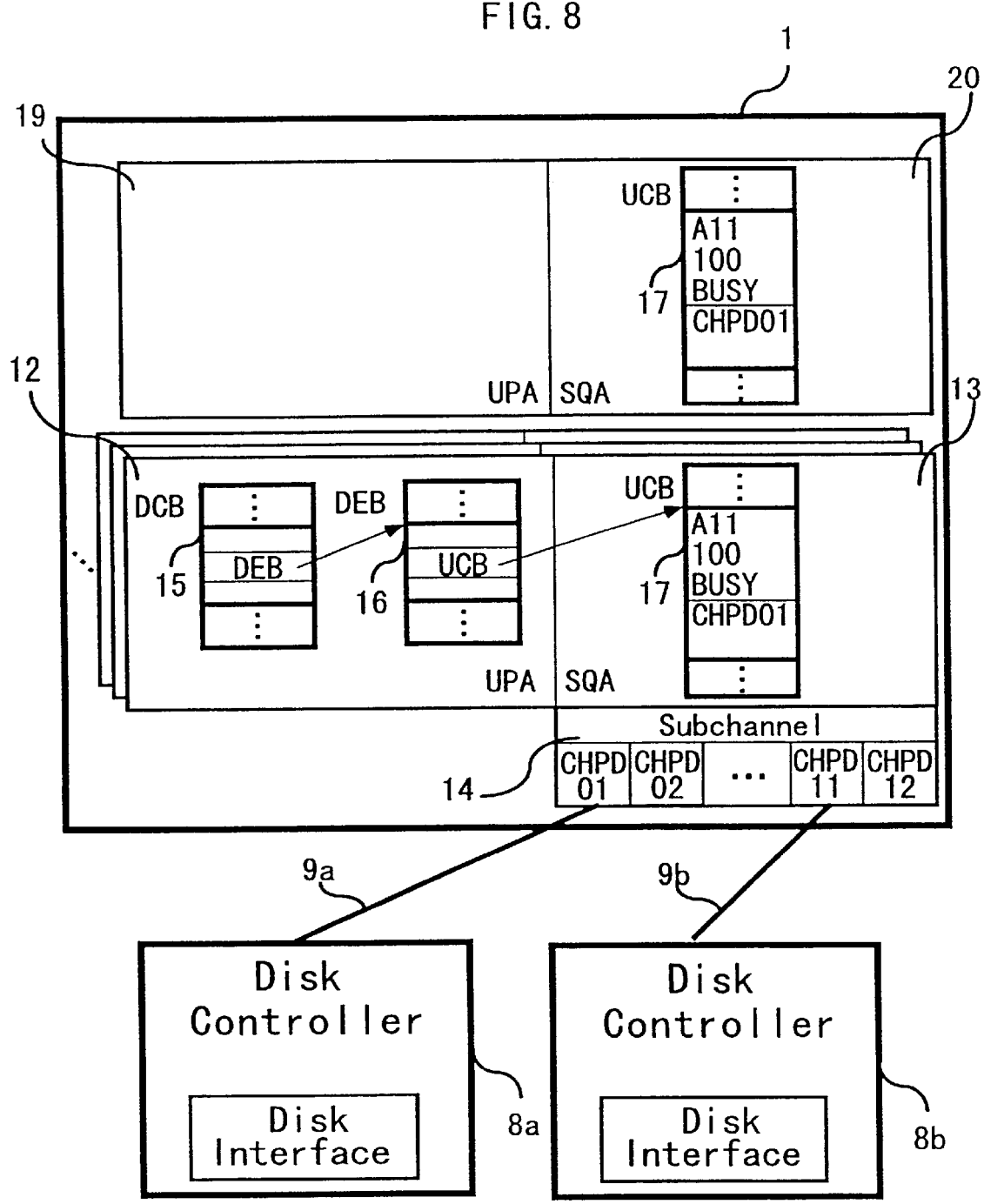
FIG. 8 is a diagram illustrating a method of changing an access path from a host computer to a disk controller.

A method of changing a channel path to be used by a volume and suspending an input/output data transfer by using the input/output control utility will be described with reference to FIG. 8. Similar to the example shown in FIGS. 6(a) and 6(b), the area of the input/output control utility has also UPA 19 for the input/output control utility and SQA 20 for the input/output control utility.

SQA is the common area for all programs. Namely, SQA 20 for the input/output control utility and SQA for other programs are the same area. This area is realized based upon the function of the MVS operating system. Therefore, if the input/output control utility rewrites the information of UCB, the information of any volume to be used by another program can be changed.

More specifically, instead of changing the setting of the channel path by rewriting the information of the channel path ID, the information of a state of a volume is changed from "READY (usable)" to "BUSY (in use)" so that the input/output data transfer can be suspended or resumed.

Figure 7:
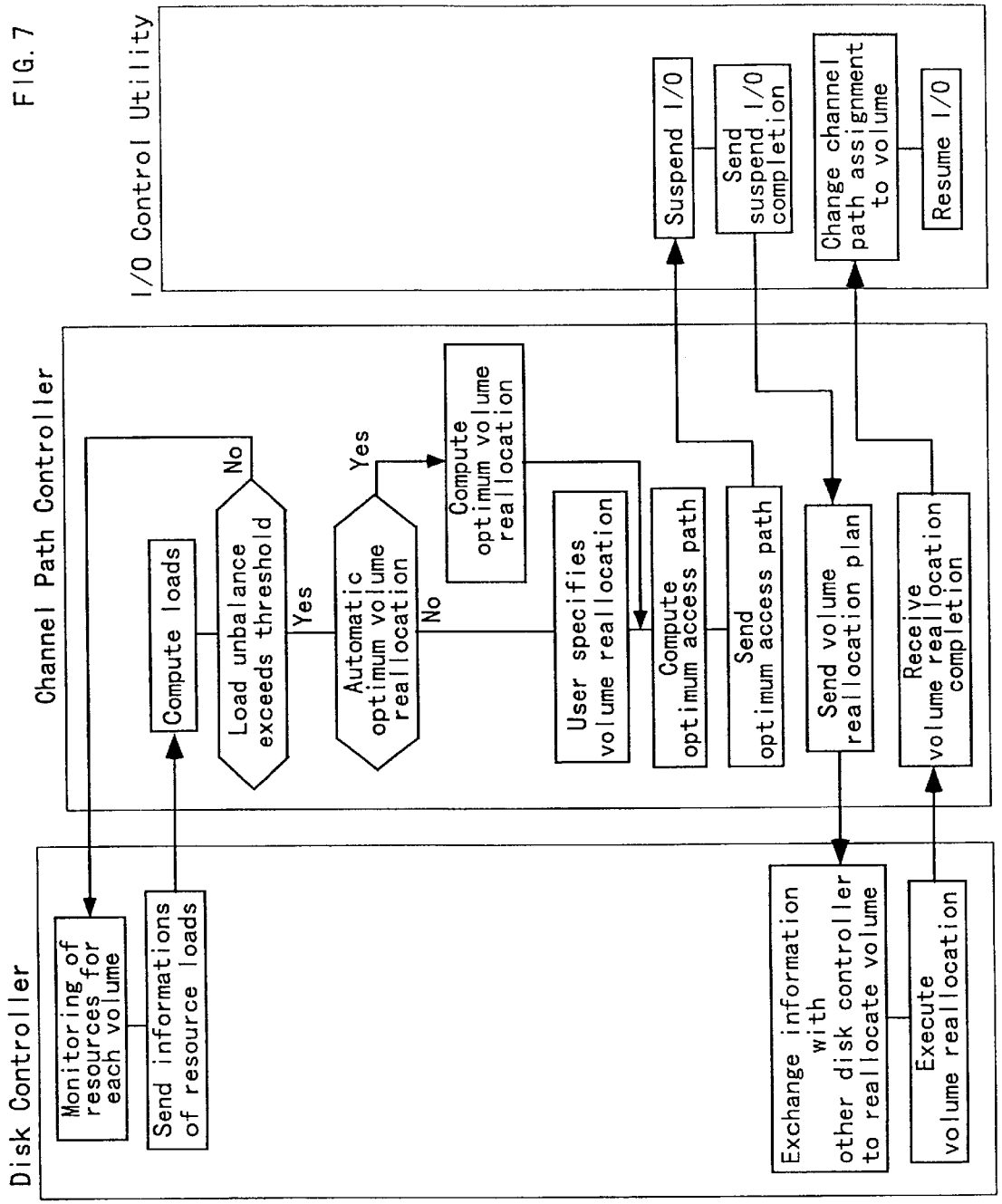
FIG. 7 is a flow chart illustrating a process of reallocating volumes and changing analyses path to be executed by a system in which setting of an access path from a host computer to a disk controller changed synchronously with a volume transfer.

Next, a specific procedure off load balancing through volume reallocation without data transfer between disk controllers according to this embodiment will be described with reference to the flow chart shown in FIG. 7.

Each disk controller monitors utilization of each resource. Information of the monitored load of the disk controller for each volume is collected by the service processor 11 via an information network such as a device network 10. This operation is the same as the first embodiment excepting that the channel path controller is replaced by the service processor.

In accordance with this load information, the service processor 11 calculates the load of each disk controller. If a load unbalance exceeds a limit value, the service processor 11 determines the volume reallocation in order to make the loads of disk controllers be balanced. The limit value is predetermined by a user. If an automatic optimum volume reallocation is designated, the service processor 11 self-regulatively determines the reallocation in order to make the loads of disk controllers be balanced. In other cases, a user specifies the reallocation. Similar functions may be provided to the disk controller in place of the service processor. The service processor is connected to the host via a communication line 18 such as a LAN (Local Area Network). Therefore, the service processor has a, function of a host console and a general terminal, i.e., the function of changing parameters of an operating system or the like of the host, executing an optional host program, and other operations.

After the new volume reallocation is determined, the service processor calculates the structure of access paths most suitable for the new volume reallocation. The structure of access paths most suitable for the volume allocation is set as shown in FIG. 6(b) so that the information of the channel path ID of the volume indicates a channel path connected to the disk controller which controls the volume.

The calculated optimum access path information is passed to the input/output control utility which is a utility program running on the host system.

The input/output control utility received the optimum access path information changes channel paths to be used by volumes in accordance with the received information. Prior to this change, accesses to all the volumes whose channel paths are to be changed are temporarily suspended. Transition to this suspended state can be achieved by changing the information of the state of each volume in UCB to a BUSY state. An I/O access issued to the busy volume is temporarily suspended at the level of the operating system. The application program issued an I/O request considers this suspension as a delayed response to the I/O request. This transition to a busy state prevents an access to the volume while the channel path and the correspondence between the disk controller and volume are changed, and also facilitates the changing procedure.

Transition to a temporary suspension of access to all volumes whose channel paths are to be changed is completed, the input/output control utility notifies the service processor of an input/output temporary suspension state transition completion. Upon reception of this notice, the service processor instructs each disk controller to reallocate volumes. Similar to the first embodiment, each disk controller exchanges volume information with another disk controller which manages the volumes, thereafter executes the volume reallocation, and notifies the service processor of the volume reallocation completion.

After the service processor confirms that the reallocation change completion notice is received from all disk controllers whose volumes are changed, the service processor instructs the input/output control utility to change a channel path usable by each volume.

After the input/output control utility changes the channel path usable by each volume, it releases the temporary suspension of volume access.

With the above operations, setting of an access path (channel path) from the host computer to the disk controller can be changed synchronously with the volume transition.

Similar to the first embodiment, the second embodiment can also be applied to a system in which an optional number of disk controllers and an optional number of disk drives are connected to the device network. If the ability of disk controllers is insufficient, additional disk controllers may be added without changing the number of disk drives to distribute loads and thereby improve the total throughput of the system.

Similar to the first embodiment, actual data transfer is not necessary even if the volume reallocation is performed. It is therefore possible to perform reallocation in a very short time in the order of second. Further, there is no information to be shared and referred to at the same time by disk controllers. Namely, the disk controller and volumes under the charge of the disk controller perform operations similar to those of a conventional single disk controller, excepting the period during volume reallocation. A disk controller does not perform an input/output transfer of data to be stored (or already stored) in the volume to another disk controller. Accordingly, both realizing smooth load balancing between disk controllers and improving the scalable performance through additional installation of disk controllers can be satisfied.

According to the invention, volume reallocation enabling load balancing is performed among a plurality of disk controllers without actual data transfer, and broader scalability and better performance can be achieved more than a conventional system using a plurality of single type disk controllers. Further, channel paths used by the host computer when it accesses disk controllers and volumes are changed to obtain a channel path structure most suitable for the volume reallocation. This change is made transparent with respect to the host computer and application program so that the operations of the host computer and application program are not necessary to be stopped and load balancing through volume reallocation can be more easily applied.

What is claimed is:

1. A storage subsystem comprising:
   a channel path controller connected to a host computer through a channel path;
   a plurality of disk controllers controlling disk volumes;
   a plurality of channel paths connecting said channel path controller and said plurality of disk controllers;
   a plurality of disk drives;
   an internal network or switch interconnecting said plurality of disk controllers and said plurality of disk drives; and
   a table specifying a relationship between the disk volumes and the disk controllers,
   wherein said table is installed in said channel path controller, and
   wherein said channel path controller changes the specified relationship in the table to effect a change in at least one of the channel paths connecting said channel path controller and said disk controllers according to a load balance of each of said disk controllers.

2. A storage subsystem according to claim 1, wherein said channel path controller includes an interface with a host computer and changes the channel path while an application program runs on the host computer.

3. A storage subsystem according to claim 1, wherein said channel path controller changes the channel path of one disk among said plurality of disk drives to an additionally installed disk controller.

4. A storage subsystem according to claim 1, further comprising:
   monitor means for monitoring a load of said plurality of disk controllers,
   wherein said channel path controller changes the disk controller in accordance with a monitor result of said monitor means.

5. A storage subsystem according to claim 4, wherein said monitor means for monitoring a load monitors utilization of a resource of each of said plurality of disk controllers.

6. A storage subsystem according to claim 5, wherein the resource is a processor, a bus, or a memory.

7. A storage subsystem according to claim 1, wherein said channel path controller changes the channel path in accordance with a command entered from an interface with a host computer or a command from any one of said plurality of disk controllers.

8. A storage subsystem according to claim 1, further comprising:
   means for storing connecting path information of paths between a host computer and said plurality of disk controllers, wherein said connection path information is changed in response to a change in the channel path by said channel path controller.

* * * * *